United States Patent

Haraszti

[15] 3,683,206

[45] Aug. 8, 1972

[54] ELECTRICAL STORAGE ELEMENT

[72] Inventor: Tegze Haraszti, Rollwagstr. 4, 71 Heilbronn, Germany

[73] Assignee: Licentia, Patent-Verwaltungs-G.m. b.H., Frankfurt am Main, Germany

[22] Filed: Jan. 29, 1970

[21] Appl. No.: 6,882

[30] Foreign Application Priority Data

Jan. 31, 1969 Germany..........P 19 04 787.1

[52] U.S. Cl................307/279, 307/221 C, 307/251, 307/304

[51] Int. Cl...............................................H03k 3/26

[58] Field of Search.............207/205, 251, 279, 304; 330/18

[56] References Cited

UNITED STATES PATENTS

| | | | |
|---|---|---|---|
| 3,421,092 | 1/1969 | Bower et al. | 307/221 C |
| 3,292,008 | 12/1966 | Rapp | 307/251 |
| 3,309,534 | 3/1967 | Yu et al. | 307/304 |
| 3,493,786 | 2/1970 | Ahrons et al. | 307/279 |
| 3,497,715 | 2/1970 | Yen | 307/304 |
| 3,521,242 | 7/1970 | Katz | 307/279 |
| 3,523,284 | 8/1970 | Washizuka et al. | 307/221 C |
| 3,268,827 | 8/1966 | Carlson | 330/18 |

OTHER PUBLICATIONS

Short; " Mos Fet Shift Register Element" Vol. 9, No. 8, Jan. 67, IBM Technical Disclosure Bulletin Pages 1047- 1049

Millman & Taub; " Pulse, Digital & Switching Wave Forms" 1965 McGraw-Hill Pages 343- 344

Boysel & Murphy; " Multiphase Clocking Achieves 100-NSEC MOS Memory" Electronic Design News June 10, 1968 Pages 50- 55

Sidorsky; " MTOS Shift Registers" Application Notes 7 pages General Instrument Corp. Dec. 67

*Primary Examiner*—Donald D. Forrer
*Assistant Examiner*—R. E. Hart
*Attorney*—Spencer & Kaye

[57] ABSTRACT

An electrical storage element comprises two controllable elements, such as field effect transistors, controllable into conducting or cut off positions in phase opposition and in dependence on the state of charge of storage capacitances, one positioned in parallel with the control path of each controllable element, charging and discharging circuits for each storage capacitance, these circuits having separate inputs to which clock pulses are applied cyclically so as to charge both capacitances and then discharging one of the capacitances depending on its original state of charge.

9 Claims, 6 Drawing Figures

Inventor:
Tegze Haraszti

BY Spencer & Kaye
ATTORNEYS

Inventor:
Tegze Haraszti
BY Spencer & Kaye
ATTORNEYS

ELECTRICAL STORAGE ELEMENT

BACKGROUND OF THE INVENTION

The invention relates to electrical storage elements.

SUMMARY OF THE INVENTION

According to the invention, there is provided an electrical storage element comprising tow-controllable elements controllable into a conducting or cut-off state in phase opposition, a storage capacitance lying in parallel with the control path of each of said two controllable elements and controlling the state of its associated controllable element, a charging circuit for each said capacitance, a discharging circuit for each said capacitance, a separate input for each of said charging circuits and each of said discharging circuits, and means for supplying cyclically repeated clock pulses separately to said separate inputs for causing charging of both said storage capacitances and thereafter discharging of one of said storage capacitances depending on its previous state of charge.

BRIEF DESCRIPTION OF THE DRAWINGS

The invention will now be described in greater detail, by way of example, with reference to the accompanying drawings, in which.

DESCRIPTION OF THE PREFERRED EMBODIMENTS

Figure 1:
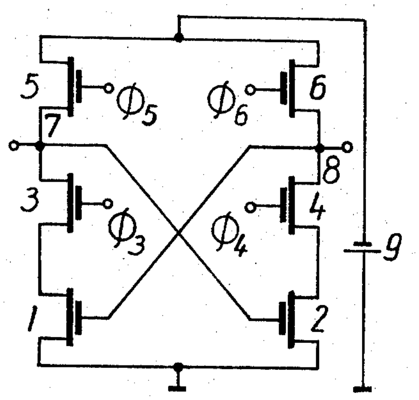
FIG. 1 is a circuit diagram of a first embodiment of the invention.

The invention relates to an electrical storage element having at least two controllable components which are in the conducting and blocked state respectively, in phase opposition, depending on the state of charge of two capacitances lying in parallel with their control paths. In such a storage element, the invention consists in that a charging circuit and a discharge circuit are provided for each of these capacitances, through which the storage capacitances are charged by means of clock pulses repeated cyclically, and are then discharged again in accordance with their original state of charge or left in the charged state.

The storage element according to the invention is particularly suitable for storing digital information and can be used, for example, in an advantageous manner for the construction of stores and registers in digital circuit arrangements of all kinds. In comparison with known storage elements, the storage element according to the invention is distinguished in particular by the high speed at which it alternates between its two possible switching states on a change in the information to be stored. A further advantage of this storage element lies in its extremely low power consumption during operation. This is attributable, in particular, to the fact that this storage element only consumes power during the recharging or charging of the storage capacitance, and at the same time ohmic losses are kept very low by the completely novel construction of this storage element. In addition, in the storage element according to the invention, the clock pulses repeated cyclically ensure that the stored information is retained for a substantially unlimited time as a result of the constant renewal of the states of charge prevailing in the storage capacitances, which renewal is caused by these pulses.

The writing of information in the storage element according to the present invention is effected in a simple manner by the fact that one or both storage capacitors is brought once into a specific state of charge according to the information to be stored, as a result of which the components connected with their control paths in parallel with these storage capacitances then change over into the conducting or blocking state. The writing of an item of information in a storage capacitance of the storage element according to the invention may be effected, for example, when the discharge circuit of the other storage capacitance is effective.

Different variations are possible for the correlation of the clock pulses in time. In general, however, the position of the pulses in time must be selected so that the charging or recharging is effected first, possibly followed by the discharge of one storage capacitance, and only when the discharge circuit of this capacitance, is open again does the charging and discharging process begin for the other storage capacitance. The clock pulses can then be selected as desired, with regard to their correlation in time, within the scope of this basic condition. For example, it is particularly advantageous to offset the individual pulses in relation to one another so that there is a certain interval between each two successive pulses in time. Another possibility consists in that the pulses which allow the charging and discharge circuit of a capacitance to become effective begin at the same moment but the pulse controlling the charging operation always ends before the clock pulse which allows the discharge circuit to become effective. With such a position of the clock pulses in time, however, care must be taken, by means of circuitry in the storage element according to the invention, to ensure that in the event of simultaneous presence of the charging and discharge pulse, the charging of the storage capacitance in question always takes place and any discharge thereof can only begin at the moment when only the pulse controlling the discharge circuit is still present. For the sake of completeness, attention may also be drawn to the fact that the clock pulses for each of the charging and discharge circuits respectively are derived from separate outputs of a generator supplying these pulses and are then taken, over separate lines, to corresponding pulse inputs of the storage element according to the invention.

In the storage element according to the invention, the control of the charging and discharge operations respectively is effected by providing gates in the charging and/or discharge circuit of each storage capacitance, which gates are opened by the clock pulses supplied to their control inputs. The two controllable components working in phase opposition are connected to one another in such a manner that the discharge circuit of each storage capacitance connected in parallel with the control path of a component leads over the current path of the other component. The term "current path" is understood to mean that current path through the controllable component which is opened or blocked under the influence of the control voltage appearing at the control path of the component in question.

A specific embodiment of the invention comprises a gate both in the charging circuit and in the discharge circuit of each storage capacitance. In this case, each of the controllable components is connected in series with the series connection of two gates between the poles of a direct-current source which supplies the current needed for the charging of the storage capacitances. In this case, the control electrode of each of the two controllable components working in phase opposition is connected to the circuit point between the two gates which are connected in series with the other component.

In another example of an embodiment of the storage element according to the invention, one gate is again provided in each of the charging and discharge circuits of each storage capacitance. In this case, however, each gate connected into the charging circuit of storage capacitance is connected to an output of the generator supplying the clock pulses in such a manner that the clock pulses controlling the gate are supplied, as charging voltages, to the storage capacitance in question, through this gate. In this example of an embodiment of the invention, therefore, the charging currents for the storage capacitances are supplied not from a direct-current source but by the generator producing the clock pulses.

Transistors, particularly field effect transistors, may be used for example for the controllable components working in phase opposition in the storage element according to the invention. Because of their high input resistances, the latter transistors have the particular advantage that their input capacitances, that is to say the capacitances acting between the control electrodes and the semiconductor body, can be used as storage capacitances. This leads to a particularly simple construction of the storage element according to the invention and above all permits the manufacture of this storage element in the form of an integrated switching circuit.

In addition, the structures of these transistors, which only conduct very low currents for a short time during the charging or discharge of the storage capacitances, may be selected very small because of the low power dissipation which occurs so that extremely low capacitance values are obtained for the storage capacitances, and in turn ensure particularly short times for switching over from one switching state to the other switching state for the storage element according to the invention built up form field effect transistors.

As for the controllable components working in phase opposition, transistors and particularly field effect transistors, are used for the gates, the control electrodes of which are supplied with the appropriate clock pulses and which are connected with their emitter-to-collector spaces or their current paths extending between source and drain, in the charging and discharge circuits respectively of the two storage capacitances.

Referring now to FIG. 1 of the drawings, the storage element illustrated consists of insulated gate field effect transistors designated by the numerals 1 to 6. The transistors 1 and 2 represent the two controllable components working in phase opposition, of which the input capacitances acting between control electrode and semiconductor body are used as storage capacitances at the same time. The other transistors 3 to 6, two of which at a time are connected in series with the transistors 1 and 2, act as gates. Their control electrodes are each connected to an output of a generator, not illustrated in FIG. 1, which supplies the clock pulses designated by $\phi_3$ to $\phi_6$. As FIG. 1 shows, the control electrode of the transistor 1 is connected to the circuit point 8 which lies between the two transistors 4 and 6, while the control electrode of the transistor 2 is connected to the circuit point 7 between the two transistors 3 and 5 connected in series with the transistor 1. As a result of this cross coupling of controllable components, the effect is achieved that the discharge circuit of a storage capacitance lying in parallel with the control path of one transistor leads through the other transistor in each case.

The currents needed for the charging of the storage capacitances are supplied by a voltage source 9, between the poles of which there are connected the series connections of the transistors 1, 3 and 5 on the one hand and 2, 4 and 6 on the other. The voltages $U_{A7}$ and $U_{A8}$, which are identical with the voltages which appear at the storage capacitances effective in parallel with the control paths of the transistors 1 and 2, are taken off, as output signals, from the storage element shown, between the circuit points 7 and 8 and the neutral point of the circuit.

Figure 2:
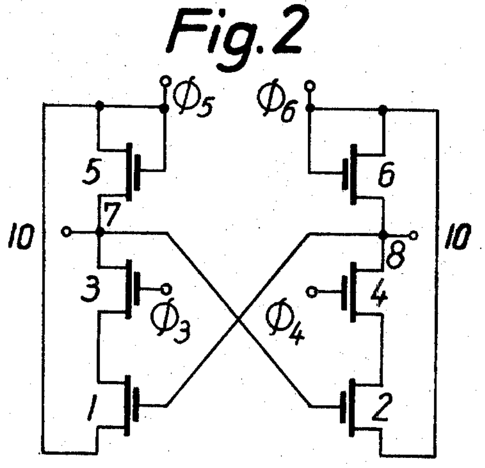
FIG. 2 is a circuit diagram of a second embodiment of the invention.

FIG. 2 shows a further example of an embodiment of the storage element according to the present invention. Here, too, three field effect transistors at a time, 1, 3 and 5 or 2, 4 and 6 are each connected in series. The transistors 1 and 2 again act as the controllable components working in phase opposition while the transistors 3 to 6 are used as gates which are changed over from the blocked to the conducting state by the clock pulses $\phi_3$ to $\phi_6$ supplied to their control electrodes. A d.c. voltage source which supplies the charging currents for the storage capacitances like the voltage source 9 in the circuit shown in FIG. 1 is eliminated in this example of the storage element according to the invention. The charging of the storage capacitances is here effected directly by the clock pulses $\phi_5$ and $\phi_6$.

In comparison with the circuit shown in FIG. 1, the storage element illustrated in FIG. 2 has the particular advantage that, as a result of the absence of the supply voltage source 9, the number of supply lines to be connected to the storage element is reduced considerably. For the sake of completeness, attention may here be drawn to the fact that all clock pulses, both here and in the circuit illustrated in FIG. 1, are related to a specific circuit point, for example to earth potential, and the semiconductor bodies of the transistors 1 to 6 are preferably likewise connected to this circuit point.

Figure 3:
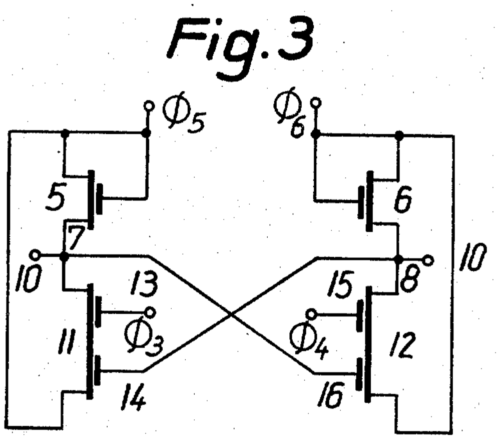
FIG. 3 is a circuit diagram of a third embodiment of the invention.
Figure 4:
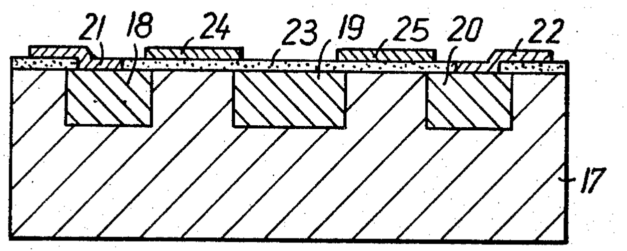
FIG. 4 is a sectional view of an active component which is particularly suitable for use with the invention.

FIG. 3 shows a modified embodiment of the storage element illustrated in FIG. 2. The two transistors 1 and 2 are each combined with the transistors 3 and 4 respectively, connected in series, to form a single transistor with two control electrodes 13 and 14 or 15 and 16 respectively. The control electrodes 14 and 16 correspond in function to the control electrodes of the transistors 1 and 2. The clock pulses $\phi_3$ and $\phi_4$ controlling the discharge circuits are supplied to the control electrodes 13 and 15. As an aid to understanding, the basic construction of such a field effect transistor with two control electrodes is illustrated in FIG. 4 and, for the sake of simplicity, will be designated hereinafter as a "double-gate field effect transistor".

The transistor consists, for example, of a semiconductor body 17 in which three regions 18, 19 and 20 are provided at one surface, which regions have a type of conductivity opposite to the adjacent semiconductor material. The regions 18 and 20, which are operated as source or drain depending on the circuit of this component, are each provided with a terminal electrode 21 or 22. The middle region 19, which does not have any external connection, serves both as source and drain. Two control electrodes 24 and 25, whereby the current paths between the three regions 18, 19 and 20 are influenced, are provided on an insulating layer 23 covering one surface of the semiconductor body 17. The terminal electrodes 24 and 25 then correspond to the electrodes 13 and 14 or 15 and 16 of the two transistors 11 and 12 shown in FIG. 3.

The use of double-gate field effect transistors is, of course, not restricted to the storage element according to the invention illustrated in FIG. 2 and such transistors may also be used instead of the transistors 1 and 3 or 2 and 4 in the circuit illustrated in FIG. 1.

Figure 5:
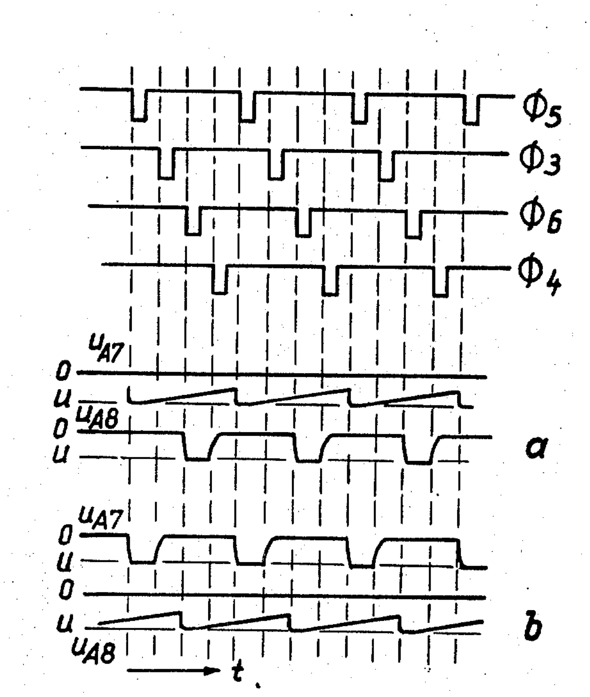
FIG. 5 shows diagrammatically the pulse operation and the resulting outputs using one form of pulse arrangement and FIG. 6 shows diagrammatically the pulse operation and the resulting outputs using another form of pulse arrangement.

FIG. 5 illustrates one possibility for the correlation in time of the individual clock pulses with one another as well as the resulting behavior in time of the output signals. In this case, the clock pulses $\phi_3$ and $\phi_4$ are offset laterally in relation to one another so that only one clock pulse at a time is effective at every moment. For the illustration, it has been assumed that the polarity of the transistors as well as that of the supply voltage sources which may be present is selected so that negative signals change the gates, as well as the controllable components working in phase opposition, over from the blocked to the conducting state. Thus the voltages applied to the storage capacitances, like the clock pulses, are of negative polarity in relation to zero potential. The curves shown under point *a* for the output voltages apply to the case where, as a result of the stored information, for example in the circuits of FIG. 1 and 2, the transistor 1 is cut off and the transistor 2 is conducting, which presupposes that the storage capacitance in parallel with the control path of the transistor 1 is discharged and the storage capacitance in parallel with the control path of the transistor 2 is charged. The output voltage $U_{A7}$, which drops from its desired value U to a lower voltage value between each two clock pulses $\phi_5$ as a result of leakage currents in the storage capacitance in parallel with the control path of the transistor 2 and is then restored to the desired value U by the next clock pulse $\phi_5$ as a result of recharging of the storage capacitance connected in parallel with the transistor 2, appears at the circuit point 7. The discharge circuit of this storage capacitance which is controlled by the clock pulse $\phi_3$ following on the clock pulse $\phi_5$ cannot be effective because the transistor 1, which is likewise connected into this discharge circuit, is in the cut-off condition because of the stored information. Thus the state of charge of the storage capacitance parallel to the control path of the transistor 2 is retained even during the clock pulse $\phi_3$. The following clock pulse in time $\phi_6$ causes the charging of the storage capacitance lying in parallel with the control path of the transistor 1 so that the voltage $U_{A8}$ at the circuit point 8 also assumes the value U. The discharge circuit for this capacitance also becomes effective with the clock pulse $\phi_4$ however. Since the transistor 2 in this discharge circuit is likewise open because of the stored information, the voltage $U_{A8}$ again drops to the value zero during the clock pulse $\phi_4$.

Point *b* shows the behavior in time of the output voltages for the second possible switching state of the storage element according to the invention in which the transistor 1 is in the conducting state and the transistor 2 in the cut-off state, and consequently the storage capacitance in parallel with the control path of the transistor 1 is charged and the storage capacitance in parallel with the control path of the transistor 2 is discharged. In this case, only a brief charging of the storage capacitance connected in parallel with the control path of the transistor 2 occurs as a result of the clock pulses because it is always discharged again as a result of the following clock pulse $\phi_3$. The output voltage $U_{A7}$ only assumes the value U temporarily and drops to the value zero again during the clock-pulse $\phi_3$. The clock pulse $\phi_6$ causes the recharging of the storage capacitance in parallel with control path of the transistor 1, whereupon the following clock pulse $\phi_4$, which controls the discharge circuit of this capacitance, cannot be effective because the transistor 1, which is likewise connected in the discharge circuit, is cut off in this case.

Figure 6:
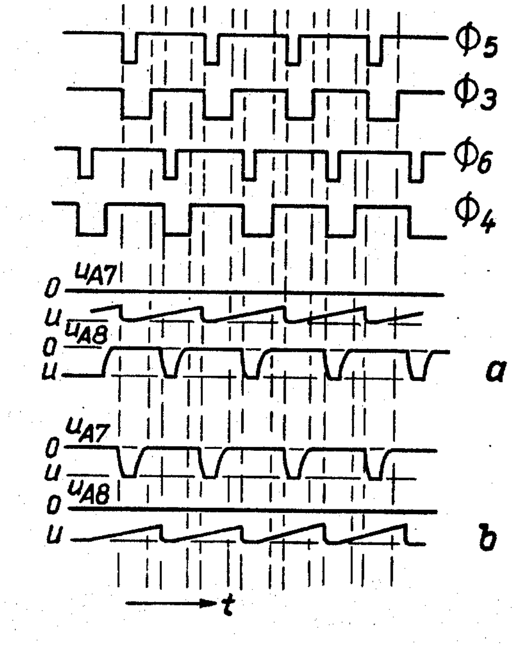

A further possibility for the correlation of the clock pulses in time is illustrated in FIG. 6 which can be used to particular advantage, primarily with the embodiment of the storage element according to the invention illustrated in FIGS. 2 and 3. The clock pulses for the charging and discharging of one and the same storage capacitance, that is to say the clock pulses $\phi_5$ and $\phi_3$ or $\phi_6$ and $\phi_4$ respectively each begin at the same moments, thus permitting a particularly simple construction of the generator supplying the clock pulses. As FIG. 6 shows, the clock pulses $\phi_3$ or $\phi_6$ controlling the discharge circuits end at a later moment than the pulses which cause the charging of the capacitances.

In this manner, insurance is provided, for example in the embodiment of the invention as illustrated in FIG. 2, that, in the presence of the pulses $\phi_5$ and $\phi_3$ for example, the storage capacitance connected in parallel with the transistor 2 is charged, the charging current flowing through the transistor 5 and possibly also through the transistors 1 and 3 if the transistor 1 happens to be in the conducting state as a result of the stored information. After termination of the pulse $\phi_5$, the discharge circuit for the storage capacitance connected in parallel with the control path of the transistor 2 then remains effective up to the end of the clock pulse $\phi_3$ so that a discharge of this storage capacitance is possible if the transistor 1 is in the conducting state as a result of the stored information. Similar considerations apply to the storage capacitor connected in parallel with the control path of the transistor 1.

In FIG. 6, the behavior in time of the output voltage $U_{A7}$ and $U_{A8}$ for the two operating states of the storage element according to the invention is again represented under points *a* and *b*. When the storage element according to the invention is in the switching state assumed for the case *a*, the storage capacitance connected in parallel with the control path of the transistor 2 is in the charged state and the storage capacitance in parallel with the control path of the transistor 1 is in the discharged state, while in the case *b*, the storage capacitance in parallel with the control path of the transistor 1 is charged and the storage capacitance in parallel with the control path of the transistor 2 is discharged. With the correlation in time selected for the clock pulses in FIG. 6, the storage capacitance charged as a result of the stored information is again recharged during the cycle of the clock pulses so that the losses of charge occurring through leakage currents are replaced. The second storage capacitance, which is in the discharge state, is again charged here by a clock pulse, as described in connection with FIG. 5, and discharged again by the following clock pulse so that the state of charge corresponding to the stored information is re-established.

In the storage element according to the invention, the output signals $U_{A7}$ and $U_{A8}$ remain ambiguous from the beginning of each clock pulse which causes the charging of one storage capacitance at least up to the moment when the discharge circuit of this storage capacitor becomes effective because both capacitance are in the charged state during this period of time regardless of the stored information. This is completely independent of the correlation in time selected for the clock pulses and occurs both with the voltage curves for the output voltages $U_{A7}$ and $U_{A8}$ illustrated in FIG. 5 and for those illustrated in FIG. 6. In order to avoid a misinterpretation of the stored information, it is advisable to couple the read-out operation, in the storage element according to the invention, to the clock pulses so that the stored information is only extracted after the clock pulses which control the discharge circuits of the storage capacitances.

Finally, it may be emphasized that the storage element according to the invention is very suitable for construction in the integrated switching technique because, as FIGS. 1 to 3 show, it can be composed exclusively of active components. With an integrated construction, the transistors 1 to 6 may then, of course, be constructed in the form of individual transistors as illustrated in FIGS. 1 and 2. Here again, however, it is considerably more advantageous to combine the transistors 1 and 3 or 2 and 4 to form double-gate field effect transistors.

It will be understood that the above description of the present invention is susceptible to various modification, changes and adaptations.

What is claimed is:

1. A four-phase electrical dynamic storage element comprising: two controllable components controllable into a conducting or cut-off state in phase opposition; a pair of storage capacitances, each of said storage capacitances lying in parallel with the control path of a different one of said two controllable components and controlling the state of its associated controllable component, a separate charging and a separate discharging circuit for each said capacitance, the discharging circuit of each capacitance consisting of the series connection of the current path of the controllable component associated with the other of said pair of capacitances and the current path of a further controllable component which forms a gate, and the charging circuit of each capacitance consisting of a further gate whose current path is connected in series with the discharging circuit of the associated capacitance; generator means for supplying cyclically repeated four-phase clock pulses separately to the control inputs of said gates for causing charging of both said storage capacitances and thereafter discharging of one of said storage capacitances depending on its previous state of charge; and means connecting each gate disposed in the charging circuit of a capacitance with an output of said generator means so that the respective clock pulses which control the gate in the charging circuit are fed to the associated capacitance via said charging circuit gate as the charging voltage.

2. A storage element as defined in claim 1, further comprising two signal outputs at which the voltages appearing at said storage capacitances are taken off as output signals.

3. A storage element as defined in claim 1, wherein said controllable components comprise transistors.

4. A storage element as defined in claim 1, wherein said two controllable components comprise insulated gate field effect transistors and said storage capacitances comprise the capacitances existing between the control electrodes and the semiconductor body of said field effect transistors.

5. A storage element as defined in claim 1, wherein said gates comprise transistors.

6. A storage element as defined in claim 5, wherein said gates are field effect transistors.

7. A storage element as defined in claim 6, wherein said field effect transistors acting as gates in said charging circuits comprise a current supply electrode connected as a drain and a control electrode connected to said current supply electrode.

8. A storage element as defined in claim 1, wherein said gate in each discharge circuit in combination with said controllable component connected thereto comprises a double-gate field effect transistor.

9. A storage element as defined in claim 1, wherein said storage element comprises an integrated switching circuit.

* * * * *